Nov. 4, 1969  TOYOAKI KOBAYASHI  3,476,220
HYDRAULIC DISC BRAKE APPARATUS AND MULTIPLE OPERATORS THEREFOR
Filed July 13, 1967
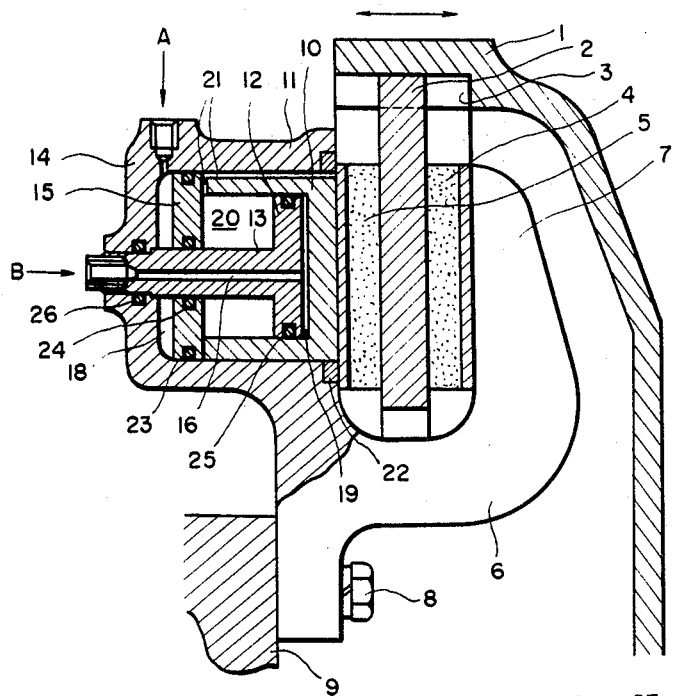
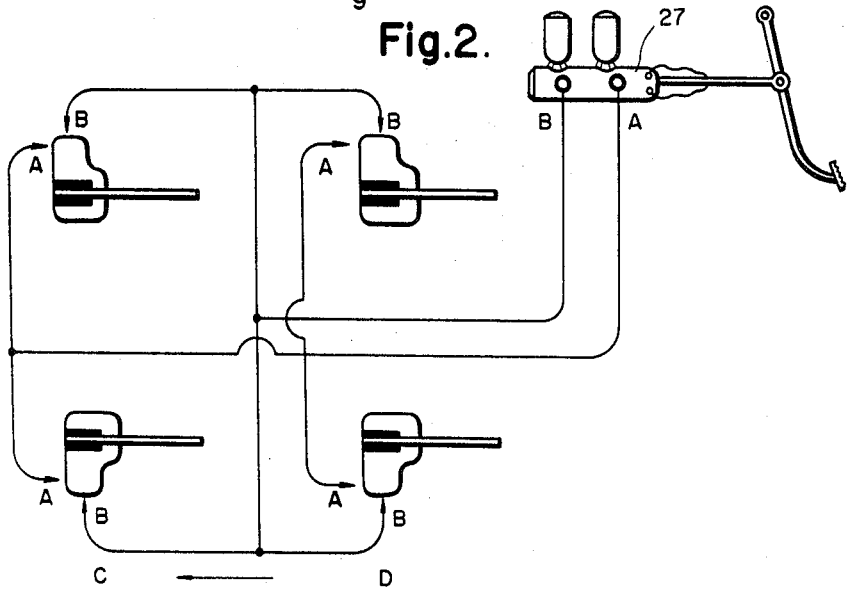
Toyoaki Kobayashi Inventor
By: Wenderoth, Lind & Ponack, Attorneys United States Patent Office 3,476,220
Patented Nov. 4, 1969

3,476,220
HYDRAULIC DISC BRAKE APPARATUS AND MULTIPLE OPERATORS THEREFOR
Toyoaki Kobayashi, Kariya, Japan, assignor to Aisin Seiki Kabushiki Kaisha, Kariya, Aichi Prefecture, Japan
Filed July 13, 1967, Ser. No. 653,108
Int. Cl. F16d 65/20; B60t 11/10
U.S. Cl. 188—106                    2 Claims

ABSTRACT OF THE DISCLOSURE

A hydraulic disc brake assembly for a motor vehicle. A brake disc is interposed between two brake linings and axially slidably mounted on a wheel part; a wheel cylinder having a piston is adapted to press the brake linings against the brake disc to effect desired braking when actuated by liquid pressure supplied from two independent liquid pressure circuits.

---

The principal object of the present invention is to provide a new hydraulic disc brake assembly, in which the piston in the wheel cylinder is normally actuated by means of pressure liquid supplied from two independent pressure liquid circuits, for obtaining stronger braking pressure.

Another object of this invention is to provide a hydraulic disc brake assembly, in which a specially designed double piston-cylinder arrangement for actuating the brake lining is employed which is not substantially longer than a single piston-cylinder, so that the brake assembly can be made compact.

It is a further object of the present invention to provide an improved hydraulic disc brake assembly, in which in case of any failure or trouble in one pressure liquid circuit the piston in the wheel cylinder may be actuated by means of pressure liquid supplied from the other pressure liquid circuit, so that it is always possible to obtain a balanced and safety braking effect for all the four wheels of the motor vehicle.

These and other objects of the present invention will become apparent from the following detailed description taken in conjunction with the accompanying drawings wherein:

FIGURE 1 is a longitudinal section of the main portion of the brake apparatus according to the present invention; and FIGURE 2 is a diagrammatic view showing the brake fluid circuits for the brake apparatus of FIG. 1, as applied to a motor vehicle.

Referring to FIG. 1, reference numeral 1 designates a brake disc holder concentric with and adapted to rotate in unison with a vehicle wheel. The brake disc 2 has friction surfaces on opposite sides, and the peripheral part thereof is engaged with an inner groove 3 formed in the holder 1. Brake linings 4 and 5 are adapted to be brought into frictional contact with said friction surfaces of the brake disc 2. The lining 4 is fixed to one leg 7 of a caliper 6. Another lining 5 is fixed to the head of a first piston 10 which is arranged in a position opposite to the lining 4. Said caliper 6 carrying the linings 4 and 5 is separately mounted on a rigid member 9 as by means of screw bolts 8. In another leg of the caliper 6 there is formed a wheel cylinder 11 containing the slidable cylindrical piston 10, which in turn contains a concentric second piston 12. The second piston 12 has a tubular stem 13 extending outwardly through a third piston 15 in the wheel cylinder 11 and through the closed end 14 of said cylinder 11. As shown, the stemless third piston 15 is disposed between the skirt of the first piston 10 and the closed end 14 of the wheel cylinder 11, and its central bore is slidable relative to said tubular stem 13 of the second piston 12. Said third piston 15 is slidable relative to the wheel cylinder 11.

Between the third piston 15 and the closed end 14 of the cylinder 11 there is inserted a compression spring (not shown). The outer end of a passage 16 in the tubular stem 13 is in communication with a pressure liquid inlet port B, while the chamber 18 adjacent the closed end 14 of the cylinder 11 is in communication with a pressure liquid inlet port A.

As will be seen, there is also formed another pressure liquid chamber 19 between the second piston 12 and the first piston 10. Said pressure liquid chambers 18 and 19 are independent of each other. There is an air chamber 20 confined by the third piston 15, the second piston 12 and the skirt of the first piston 10. In accordance with any wear of the lining, the pistons 10 and 15 will be moved forwardly, thereby the volume of the air chamber 20 will be reduced accordingly. To allow the escape of air in such case, there are provided radial and longitudinal slots 21 at the outer end face and peripheral surface of the piston 10. 22 is a dust proof seal, and 23 is a liquid seal ring on the third piston 15. 24 is a liquid seal between the central bore of the third piston 15 and the tubular stem 13 of the second piston 12. The pressure chamber 18 is maintained liquid tight by means of a liquid seal 26. The pressure liquid chamber 19 is sealed from the air chamber 20 by means of a liquid tight packing ring 25. The pressure liquid is separately fed from the independent sources of pressure A and B in a master cylinder 27, and supplied to the front wheels C and the rear wheels D, respectively, as diagrammatically shown in FIG. 2.

The operation of the present invention is as follows: Liquid pressure, i.e. oil pressure, supplied from A will press the third piston 15, and its pressure is transmitted to the piston 10. Accordingly, the friction lining 5 will be pressed against the brake disc 2. On the other hand, oil pressure supplied from B acts in the chamber 19 to press the piston 10 and will press the said lining 5 in the similar manner.

From the foregoing it will be seen, according to the present invention, that the both pressure chambers 18 and 19 are operative under normal operative condition of the oil circuits A and B, so that stronger braking power can be obtained with a compact dimension of the wheel cylinder. Moreover, in case of any failure or trouble in either one of the oil circuits A and B, either the pressure chamber 18 or the pressure chamber 19 may effectively function, whereby maintaining desired balance of the braking action of the left hand and right hand and front and rear wheels, although there would be necessity of applying somewhat increased treading pressure on the brake pedal, so that it is possible to always attain the most safety operation of the brake apparatus.

While in the above mentioned embodiments of the present invention only one wheel cylinder 11 is shown as arranged on one side only, it should be understood that the present invention is also applicable to such brake apparatus in which two cylinders are ararnged vis-a-vis with respect to the brake disc 2, said oppositely arranged two cylinders being in communication with two independent sources A and B of the brake fluid.

What I claim is:

1. A hydraulic disc brake assembly for a motor vehicle, comprising a brake disc adapted to be mounted on a wheel part, brake linings movable into frictional contact with said brake disc, a wheel cylinder having a first piston therein having one of said brake linings thereon, said cylinder having a closed end remote from said one of said brake linings, said first piston having a cylindrical skirt portion opening rearwardly away from the brake lining, a second piston within the skirt portion of said first piston and on which said first piston is slidable and forming a chamber within said skirt portion and having a tubular stem of a diameter only a small fraction of the diameter of said second piston extending through the closed end of the cylinder, said stem having a central bore therein adapted to be placed in communication with a source of liquid pressure and opening into said chamber formed by the second piston within the skirt portion, and a third piston in said wheel cylinder abutting against the rear end of the skirt of said first piston and in sliding fluid tight engagement around said stem and forming a second liquid chamber with the closed end of the cylinder, the effective pressure receiving area of said third piston being much larger than the effective force receiving area of the rear end of said skirt, said cylinder having an aperture opening into said second chamber and adapted to be placed in communication with another source of pressure oil.

2. A hydraulic disc brake assembly as claimed in claim 1, further comprising independent pressure lines from said aperture in said second chamber at the closed end of the cylinder and said central bore opening into the chamber in the skirt portion of said first piston and adapted to be connected to two independent sources of liquid pressure respectively.

References Cited

UNITED STATES PATENTS

| | | | |
|---|---|---|---|
| 2,497,438 | 2/1950 | Butler | 188—152 |
| 3,100,553 | 8/1963 | Butler | 188—152 X |
| 3,312,313 | 4/1967 | Moyer | 92—61 |

FOREIGN PATENTS

| | | |
|---|---|---|
| 951,906 | 3/1964 | Great Britain. |
| 355,961 | 8/1961 | Switzerland. |
| 997,933 | 9/1951 | France. |

GEORGE E. A. HALVOSA, Primary Examiner

U.S. Cl. X.R.

92—62, 107, 129; 188—152